March 14, 1933.  J. HAUK  1,901,596
BOTTLE HANDLING MACHINE
Filed Oct. 10, 1931  5 Sheets-Sheet 1

INVENTOR
Joseph Hauk
BY Quarles & French
ATTORNEYS

March 14, 1933.  J. HAUK  1,901,596

BOTTLE HANDLING MACHINE

Filed Oct. 10, 1931  5 Sheets-Sheet 3

Inventor
Joseph Hauk
By
Charles J. French
Attorneys

March 14, 1933.  J. HAUK  1,901,596
BOTTLE HANDLING MACHINE
Filed Oct. 10, 1931    5 Sheets-Sheet 4
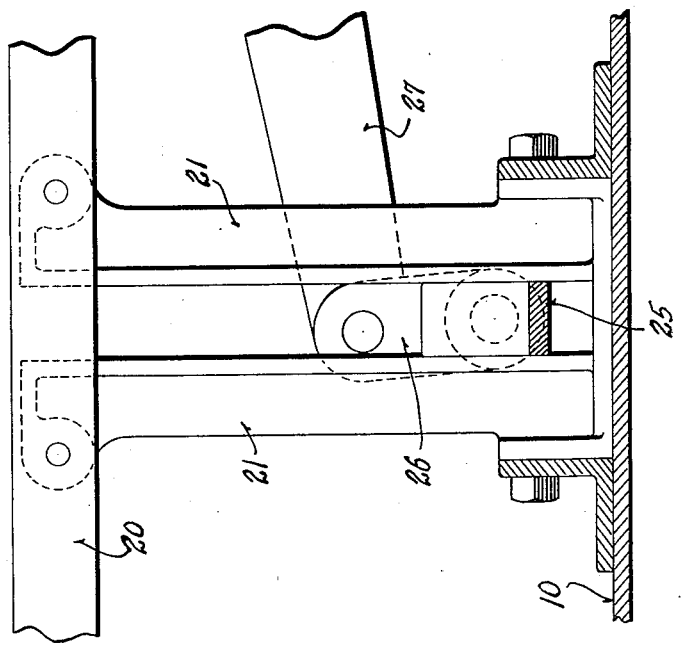
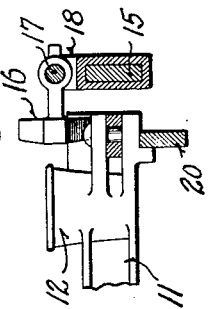
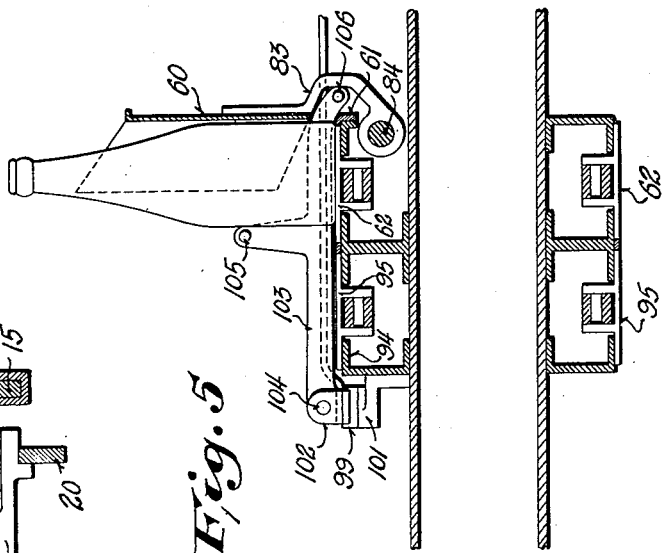
Inventor
Joseph Hauk
By Quarles & French
Attorneys March 14, 1933.   J. HAUK   1,901,596
BOTTLE HANDLING MACHINE
Filed Oct. 10, 1931    5 Sheets-Sheet 5

Fig.6

INVENTOR
Joseph Hauk
BY
Charles & French
ATTORNEYS

Patented Mar. 14, 1933

1,901,596

UNITED STATES PATENT OFFICE

JOSEPH HAUK, OF SHOREWOOD, WISCONSIN, ASSIGNOR TO PHILIP C. READ, OF MILWAUKEE, WISCONSIN

BOTTLE HANDLING MACHINE

Application filed October 10, 1931. Serial No. 568,029.

The invention relates to bottle washing machines and more particularly to unloader mechanism for such machines.

One of the objects of the invention is to provide mechanism for successively unloading bottles from an intermittently moving conveyor and turning the bottles from an inverted to an upright position. More particularly the mechanism provides a device for lifting the bottle, in an inverted position, from the conveyor, turning it partially over and then removing the bottle from the lifting means and completing its turning movement to upright position and depositing it upon a delivery conveyor.

A further object of the invention is to provide an unloader in which bottles of different sizes may be handled by the same conveyor with provision for depositing the bottles of one size on one delivery conveyor and those of another size on another delivery conveyor so that bottling machines for different products may be served by the same bottle treating machine thus effecting decided savings in equipment and cost of handling the bottles.

The invention further consists in the several features, combinations and subcombinations of elements hereinafter set forth and more particularly defined by claims at the conclusion hereof.

In the drawings; Fig. 1 is a plan view of an apparatus embodying the invention, parts being broken away;

Fig. 4 is a detail vertical sectional view taken on the line 4—4 of Fig. 3;

Fig. 5 is a detail sectional view showing part of the mechanism shown in Fig. 2 in discharging position;

Fig. 6 is a side elevation view of the apparatus, parts being broken away and parts being shown in section;

Fig. 7 is a detail sectional view taken on the line 7—7 of Fig. 1 through the conveyor.

Figure 1:
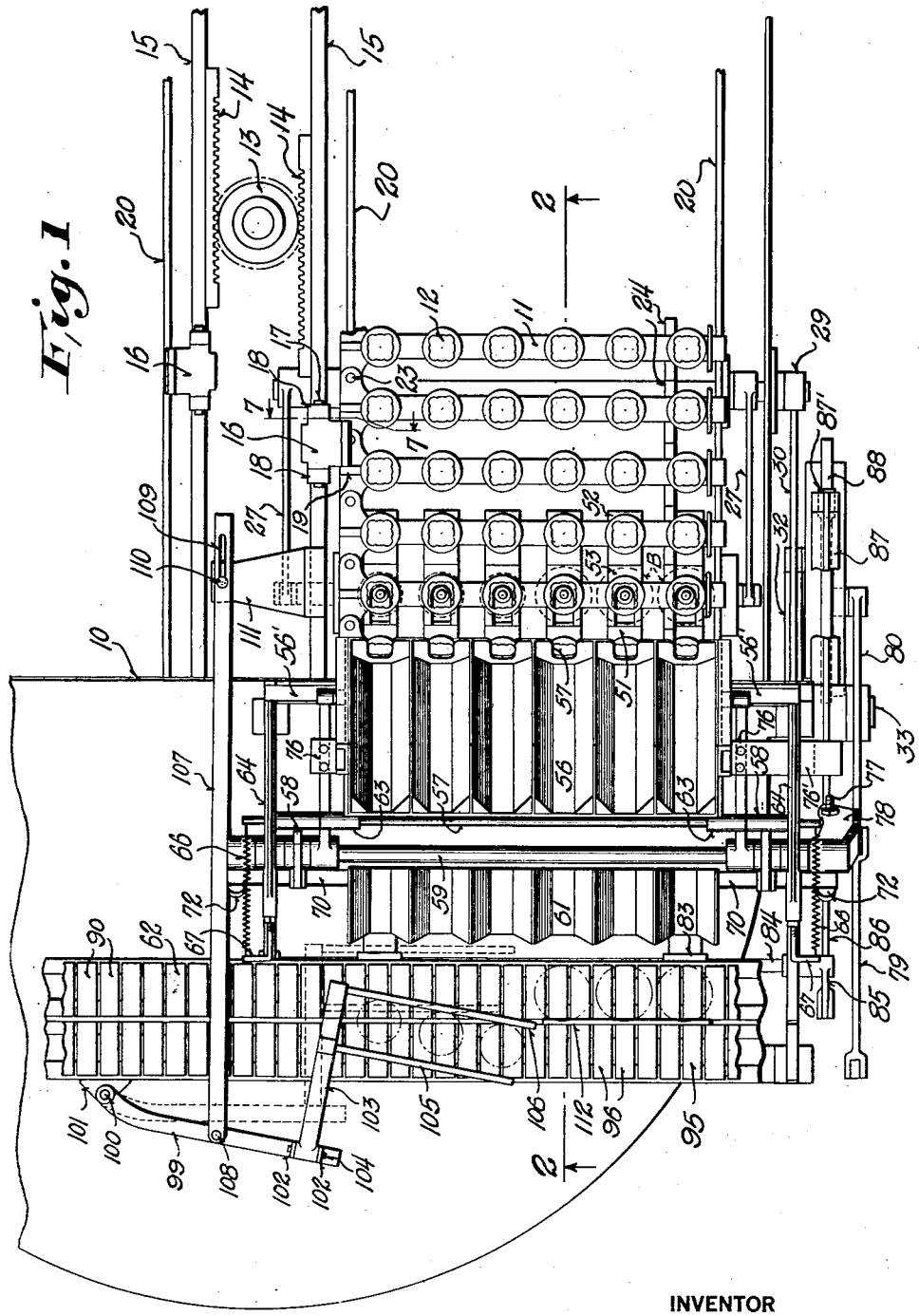

Referring to Figs. 1 to 3 and 7, the numeral 10 designates the frame of the machine in which an endless conveyor is mounted, said conveyor including spaced transversely disposed members 11 provided with a plurality of bottle holding pockets 12 wherein the bottles B for example, quart or pint beverage bottles, are mounted in inverted position and carried through the washing machine by the step by step or intermittent progressive movement of the conveyor. Feed mechanisms for moving the conveyor in this manner are old and well known and I will therefore only point out that in the present instance a suitably driven oscillatory pinion 13 engages oppositely disposed racks 14, on feed bars 15, each of which has a feed dog 16 pivotally supported by a shaft 17 on brackets 18 on the feed bar, each dog engageable with lugs 19 on the sections of the conveyor and cooperating with each of these lugs in the manner of a gravity actuated latch to engage behind one of said lugs and feed the conveyor forward on the forward movement of the feed bar 15 and then ride over the next lug and drop behind the same on the rearward movement of the feed bar.

The conveyor members 11 are mounted to move on spaced tracks 20 supported at intervals by suitable brackets 21, one end of each member carrying a roller 22 riding on one of the tracks and the other ends connected together by pivot pins 23, the roller carrying ends of said members also having abutting lugs 24 to keep the conveyor sections in proper spaced position.

After the bottles have been washed and otherwise treated they are moved by the conveyor to bring their mouths over the mechanism for lifting them out of the pockets of the conveyor which is shown more particularly by Figs. 2, 3, 4 and 6 of the drawings. This mechanism includes a frame or bar 25 slidably mounted and guided on certain of the spaced brackets 21 and having the articulated lifting means hereinafter described mounted to move with and relative to this bar. The bar 25 is operatively connected by links 26 at each end with a lever arm 27 at each end of a shaft 28 which carries a lever arm 29 operatively connected by a link 30 to one arm 31 of the cam operated lever 32 pivoted at 33 and provided with a roller 34 working in the cam groove 35 of a cam member mounted on the power driven shaft 36, this cam serving to lift the bar in proper cyclic synchronism with the rest of the machine so that said bar is raised during the dwell of the conveyor.

Figure 2:
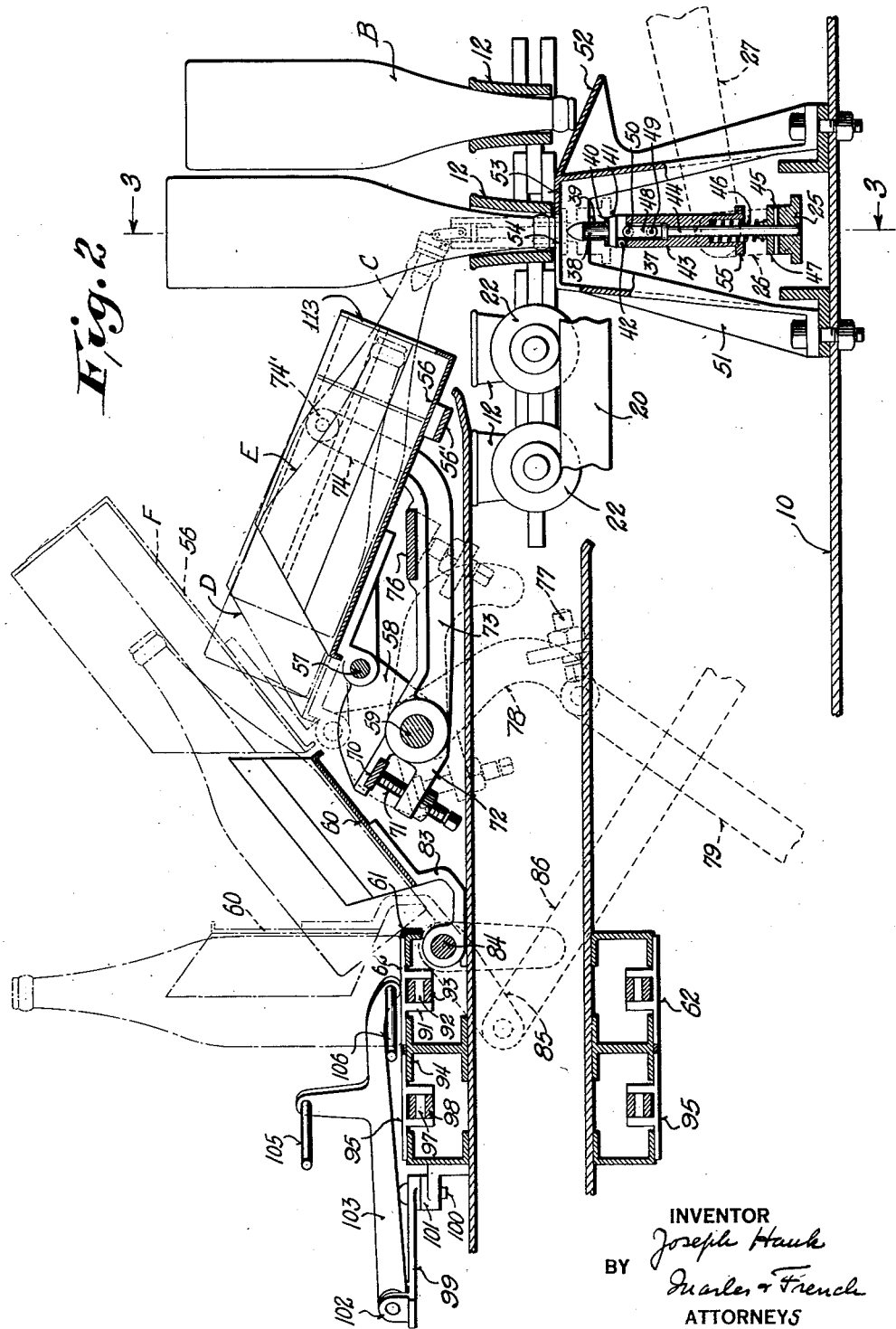
Fig. 2 is a detail sectional view taken on the line 2—2 of Fig. 1.
Figure 3:
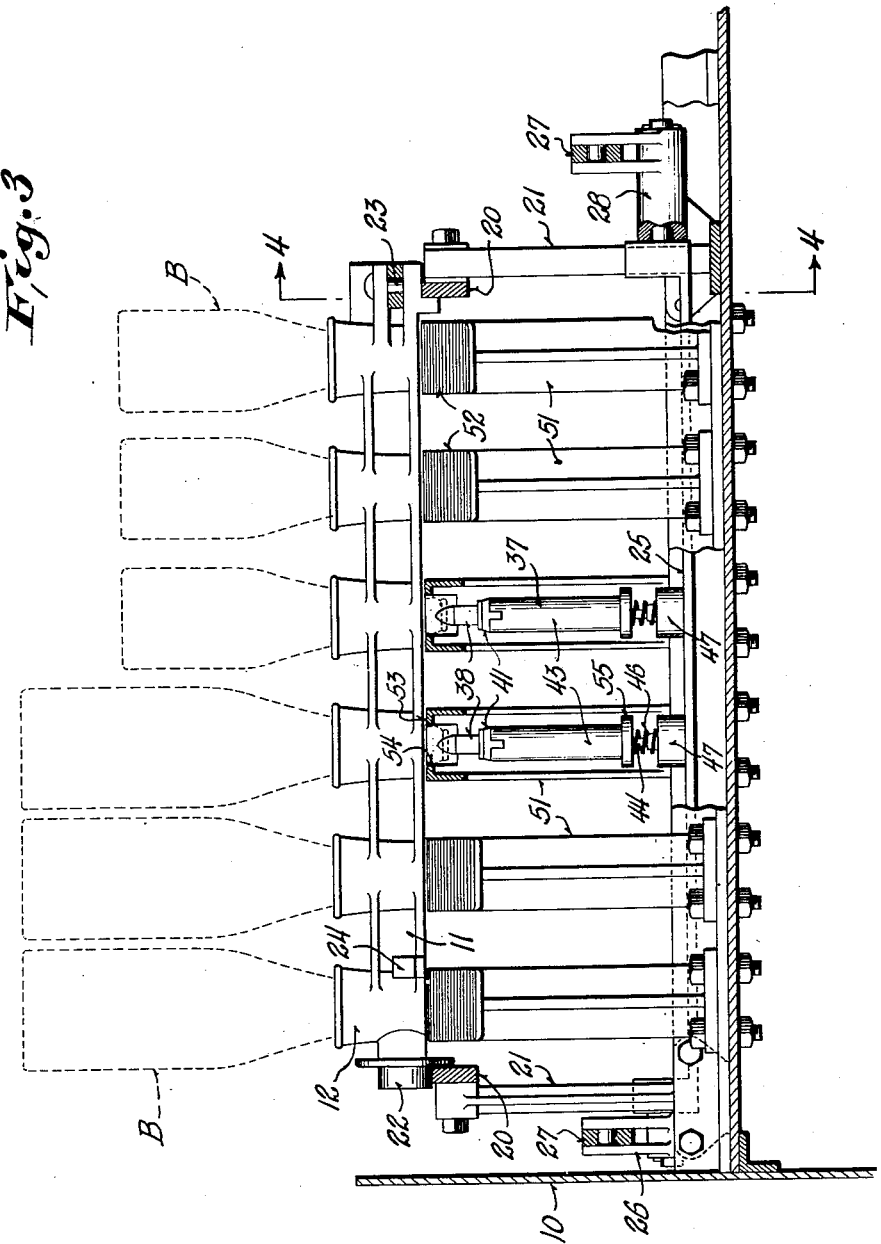
Fig. 3 is a detail vertical sectional view taken on the line 3—3 of Fig. 2.

The articulated lifting means includes a series of articulated carriers 37, one of which is shown in detail in Fig. 2. These carriers have an upper plunger portion 38 adapted to enter the mouth of the bottle and provided with a tubular rubber facing 39 and a rubber pad or seat portion 40, the base 41 of said plunger having a hinge connection at its advancing side through the pivot pin 42 with a tubular member or support 43 which is slidably mounted on an opening rod 44, secured to the bar 25 as by a pin 45. This tubular member is urged to a position above the bar by a spring 46 interposed between a boss 47 on said bar and the member 43 and which spring permits movement of the rod 44 under the action of the bar 25 after the member 43 has ceased its upward movement. The upper end of the rod 44 is operatively connected by a link 48, and pivot pins 49 and 50 to a part of the base 41 rearward or beyond its point of pivotal connection at the pivot 42 with the member 43.

A frame member 51 cooperates with each of these carriers 37 and has an inclined shelf or support 52 which engages the mouth end of the bottle so as to partially raise the same out of its carrying pocket or holder 12 as the conveyor brings the bottles over the carriers 37 and said member 51 has a top portion 53 over which the bottles ride which is slotted at 54 to allow the carrier to pass upwardly therethrough, the sides of said top portion 53 also acting as stops to engage the flanged lower end 55 of the member 43 to limit its upward movement. The partial movement of the bottle out of its holder before the action of the plunger is not absolutely essential to the obtaining of all the advantages of the novel and peculiar lifting means herein described but its use decreases the overall length of the stroke of the carrier that would otherwise be employed and to this extent simplifies the machine and makes it more compact.

With the above construction, as the bottles are carried along by the conveyor their mouths slide up the inclined support 52 as shown in Fig. 2 and then they proceed in a partially raised position over the top portion 53 and when they move over the slotted portions 54, the carriers 37 rise so that the plungers 38 move into the mouths or necks of the bottles until the pads 40 engage the edges of the mouths of the bottles. On the continued lifting movement of the carriers 37 under the action of the raising of the bar 45 and the rods 44 associated therewith the bottles are raised up out of the holders and this movement continues until the stop flanges 55 of the carriers engage the top portions 53 of the frame members 51 and thereafter as the bar 45 moves upwardly the rods 44 also move upwardly while the tubular members 43 are at rest and this upward movement of rods 44 acting through the links 48 on the bases 41 of the plungers 38 causes the plungers 38 to swing forwardly about their pivots 42 and thus swing or turn the bottles over to the inclined position designated C in Fig. 2, the springs 46 permitting this relative movement of the parts of the carrier 37 and acting to return the parts 44 and 45 to their spaced relation on the return or downward movement of the carriers.

Thus by the above described mechanism the rows of bottles are successively lifted out of the pockets of the conveyor and turned by their lifting means to an inclined position and then removed therefrom by the mechanism now to be described.

As the bottles are turned over to an angle of about sixty degrees each bottle enters a cradle or trough 56, then ready to receive it, the neck of the bottle projecting through a slot 113 in the end of said cradle. The cradles 56 are pivotally mounted on a shaft 57 mounted in supporting lever arms 58 in turn mounted to swing about a pivot shaft 59 so that when the cradles are in the lower full line position, shown in Fig. 2, the bottles will be deposited therein in the position C and then as the lever arms 58 swing upwardly the cradles will move forwardly to the dotted line position D and since the necks of the bottles are engaged by the sides of the slots 113 at the ends of the cradles the bottles will move forwardly with the cradles and thus be moved away from the plungers 38 and assume the dotted line position E. Thereafter the turning of the bottle to upright position is completed and this may be done in various ways but is preferably accomplished by moving the cradle 56 to the upper dotted line position F and allowing the bottle to move by gravity along a delivery trough 60, shown in full lines in Fig. 2 until the bottom of the bottle strikes a stop 61, here shown as a rubber pad about which it is turned to upright position upon a conveyor 62 as this trough 60 swings upwardly to vertical position shown in dotted lines in Fig. 2 and in full lines in Fig. 5.

The mechanism for operating the cradle 56 is shown more particularly in Figs. 1, 2 and 6 from which it will be observed that the cradles 56 are connected together as a unit with pivot bearings 63 at the ends of this unit journalled on the shaft 57 which is carried in the spaced lever arms 58 mounted on the shaft 59, pivoted in the bearing brackets 64. The shaft 57 has pin extensions 65, each connected by a spring 66 with a spring anchor or hook 67 having threaded ends adjustably mounted in the brackets 64 and secured in adjusted position by a lock nut 68, said extensions working through arcuate slots 69 in said brackets, these springs being put under tension when the cradles 56 are moved downwardly to receive the bottles from the carriers 37. A stop bar 70 extends transversely across the machine and is connected to the lever arms 58 and has extensions adapted to be engaged by adjustable set screws or tappet 71 carried in arms 72 secured to the end portions of the shaft 59. Lever arms 73 are also pivotally mounted on the shaft 59 and each has an upturned end 74 carrying a roller 74' working in a slot or guideway 75 formed in the outer sides of the outermost cradles. These lever arms 73 are connected together by a transversely extending bar 76 which has an extension 76' adapted to be engaged by an adjustable set screw or tappet 77 mounted on a lever arm 78 secured to the shaft 59. The shaft 59 is oscillated through the operative connection of its lever arm 78 by the link 79 with a cam operated lever 80 pivoted on the shaft 33 and carrying a roller 81 working in a cam groove 82 on the cam member mounted on the driven shaft 36, said cam serving through this linkage to turn the shaft 59 in a clockwise direction to cause tappets 71 to engage the bar 70 and swing the lever arms 58 to the full line position shown in Fig. 2 thereby putting the springs 68 under tension when the troughs 56 are in their lowered position, which cam after a dwell during which the bottles are lowered into the trough, then acts to turn the shaft 59 counterclockwise thereby allowing the springs 68 to act through the lever arms 58 and shaft 57 to swing the troughs 56 back to the position D and then on the continued movements the tappet 77 strikes the extension 76' which through bar 76 acts to swing the lever arms 73 upwardly which through their sliding connections with the trough unit acts to swing it upwardly to the position F to deliver the bottles. Thereafter the cam acts to turn the shaft 59 in a clockwise direction back to its initial position. Thus the whole composite movement of the cradles or troughs 56 is effected by one cam. The downward movement of the trough unit is limited by a transverse bar 56' engageable with blocks 64' at the ends of the cradles and connected to the brackets 64.

The troughs 61 are connected together to form a unit having bearing extensions 83 secured to an oscillatory shaft 84 which carries a crank arm 85 operatively connected by a link 86 with a cam operated lever 87 pivoted on the shaft 33 and carrying a roller 87' engaging the cam surface 88, said lever being held against the cam by the spring 89 and serving to move the trough 60 in proper timed relation with the other parts of the mechanism to receive the bottles from the cradles 56 and deposit them on the conveyor 62.

The conveyor 62 is formed of a plurality of plates 90 having depending flanges 91 connected by pins 92 to the links 93 of an endless chain so as to form an endless conveyor, the upper run of this conveyor passing over a supporting frame work 94.

Another conveyor 95 similar to the conveyor 62 and including plates 96 connected by pins 97 to the links 98 of an endless chain is arranged alongside of the conveyor 62 with its upper run passing over the supporting frame work 94. Both the conveyors 62 and 95 are driven continuously in any suitable manner.

It has been noted that the conveyor members 11 are arranged to receive a plurality of bottles in the holders 12 and six such holders are shown. The unloading mechanism previously described will therefore deposit a row of six bottles on the conveyor 62 during each cycle of operations of the machine and Fig. 3 of the drawings shows that different size bottles may be handled by the unloader. In order that bottles of one size may be automatically sent to the proper bottling machine if desired or in order that the bottles may be distributed to different machines after treatment if desired I have provided the two conveyors 62 and 95 with means acting in conjunction therewith to distribute the bottles received from the unloader upon each of the conveyors, for example half of the bottles, that may be of one size as quarts, are carried off by the conveyor 95 and the other half of the bottles, that may be of a different size as pints or a different style of bottles, are carried off by the conveyor 62.

The mechanism for distributing or dividing the bottles between the plurality of delivery conveyors is shown in Figs. 1, 2 and 5 and will now be described. An oscillatory lever 99 is pivotally connected by a pin 100 to a supporting bracket 101 and the free outer end of this lever has spaced vertically disposed ears 102 to which a sorting or dividing arm 103 is pivotally connected by a pin 104, said arm having laterally disposed spaced fingers or rods 105 and 106. The finger 105 is positioned on the arm 103, intermediate its ends, in a somewhat elevated position while the finger 106 is at the outer end of the arm and is adapted to be disposed in the space between the stops 61 alongside said arm and one of the bearing members 83 until moved by the mechanism for moving the lever 99. When said lever 99 is moved the three bottles which are then in an upright position, as shown in connection with the one bottle in Fig. 5, and disposed in the space between the fingers 105 and 106 are moved by said fingers off of the conveyor 62 and onto the conveyor 95 so that they will be switched over to the conveyor 95 and carried off by the same, the finger 106 moving up over the stops 61 and pushing the bottles ahead of it.

The control and movement of the lever 99 is effected from the feed mechanism for the main conveyor through a push and pull bar 107 which is pivotally connected by a pin 108 to an intermediate portion of the lever 99 and has a lost motion connection with one of the feed bars 15 through the slot 109 in said bar and a pin 110 working in said slot and mounted on a bracket 111 secured to the feed bar.

With this construction as the bar 15 completes its forward movement, the pin 110 engages the forward end of the slot 109 and moves the lever 99 and arm 103 to the full line postion shown in Fig. 1 and thus moves the bottles that have been deposited upon the conveyor 62 during the previous cycle adjacent the arms 105 and 106 from the conveyor 62 to the conveyor 95 and this conveyor moves them away during the time the pin 110 is travelling back in the slot 109 on the backward movement of the bar 15 and as said bar completes this backward movement the pin 110 engages the other end of the slot 109 and moves the lever 99 and arm 103 to the dotted line position shown in Fig. 1.

As the bottles are delivered in upright position on the delivery table including the conveyor 62, the finger 105 acts as a steady rest for the three bottles of the series while a backplate 112 between the conveyors acts in a similar manner for the other three bottles of the series.

From the foregoing it will be noted that the bottles are removed from the holders 12 and turned over into the cradles 56 by the action of the articulated carriers 37, that they are removed from said carriers by the cradles 56 and then turned to a position for discharge into the delivery trough 60 which acts to deposit them in upright position in the delivery conveyor 62 and that some of the bottles may be separated from the others and switched over onto the conveyor 95 so that the one machine will handle bottles for bottling machines of different products.

I desire it to be understood that this invention is not to be limited to any particular form or arrangement of parts except in so far as such limitations are included in the claims.

What I claim as my invention is:

1. In a bottle unloading apparatus, the combination of a conveyor having bottle holding pockets arranged in rows and carrying the bottles in inverted position, articulated carriers including plungers engageable with the bottles to lift the same out of said pockets and turnable with said bottles to an inclined position, and mechanism for removing the bottles from said plungers and turning them to upright position.

2. In a bottle unloading apparatus, the combination of a conveyor having bottle holding pockets arranged in rows and carrying the bottles in inverted position, articulated carriers including pivotally mounted plungers engageable with the bottles to lift the same out of said pockets and turnable with said bottles to an inclined position, means for partially lifting the bottles out of said pockets as they are moved by said conveyor over said plungers, and mechanism for removing the bottles from said plungers and turning them to upright position.

3. In a bottle unloading apparatus, the combination of a conveyor having bottle holding pockets arranged in rows and carrying the bottles in inverted position, means for both lifting the bottles out of the pockets and turning them, movable cradles for receiving the bottles from said lifting means, removing them therefrom and turning them toward upright position, and means for turning the bottles received from said cradles to upright position.

4. In a bottle unloading apparatus, the combination of a conveyor having bottle holding pockets arranged in rows and carrying the bottles in inverted position, articulated carriers for lifting the bottles out of the pockets and turning them, movable cradles for receiving the bottles from said carriers, removing them therefrom and turning them toward upright position and an oscillatory carrier for receiving the bottles from said cradles and moving them to upright position.

5. In a bottle unloading apparatus, the combination of a conveyor having bottle holding pockets arranged in rows and carrying bottles in inverted position, articulated carriers including reciprocatory supports and plungers engageable with the bottles and pivotally mounted on said supports, means for moving said supports and plungers together to lift the bottles out of said pockets and for moving said plungers independently of said supports to turn the bottles, and means for removing the bottles from said plungers while in turned position.

6. In a bottle unloading apparatus, the combination of a conveyor having bottle holding pockets arranged in rows and carrying bottles in inverted position, articulated carriers including pivotally mounted reciprocatory plungers engageable with the bottles to lift the same out of said pockets and turnable with said bottles to an inclined position, movable cradles for receiving the bottles, pivoted supports upon which said cradles are pivotally mounted, means for swinging said pivoted supports to cause said cradles to remove the bottles from said carriers, means for swinging said cradles about said supports to move the bottles toward upright position, and means for receiving the bottles from said cradles and moving them to upright position.

7. In a bottle unloading apparatus, the combination of a conveyor, having bottle holding pockets arranged in rows and carrying bottles in inverted position, articulated carriers including reciprocatory supports and plungers engageable with the bottles and pivotally mounted on said supports, an operating bar, operating rods mounted on said bar and operatively connected to said plungers for tilting the same about their pivots, a yielding connection between said supports and said operating bar, and means for reciprocating said operating bar to move said plungers and supports to lift the bottles out of said pockets and to move said plungers and operating rods independently of said supports to turn the bottles, and means for holding said supports against movement while independently moving said rods and plungers.

8. In a bottle unloading apparatus, the combination of a conveyor having bottle holding pockets arranged in rows and carrying bottles in inverted position, articulated carriers including pivotally mounted reciprocatory plungers engageable with the bottles to lift the same out of said pockets and turnable with said bottles to an inclined position, movable cradles for receiving the bottles, pivoted supports upon which said cradles are pivotally mounted, means for swinging said pivoted supports to cause said cradles to remove the bottles from said carriers, means for swinging said cradles about said supports to move the bottles toward upright position, a support, and means cooperating with said support and receiving the bottles from said cradles and moving them about said support to upright position thereon.

9. In a bottle washing machine, the combination with a conveyor having bottle holding pockets arranged in rows, a plurality of delivery conveyors, unloading mechanism for removing the bottles from said pockets and depositing them on one of said delivery conveyors, and mechanism coordinatively actuated by said pocketed conveyor for removing some of the bottles deposited on the first delivery conveyor from said conveyor onto another delivery conveyor.

10. In a bottle washing machine, the combination with the main conveyor for carrying the bottles in inverted position, of adjacently arranged delivery conveyors, unloading mechanism for removing the bottles from the main conveyor and depositing them in upright position on one of said delivery conveyors, and means coordinatively actuated by said pocketed conveyor engageable with some of the bottles thus deposited to move them onto the adjacent delivery conveyor.

11. In a bottle washing machine, the combination with the main conveyor for carrying the bottles in inverted position and means for intermittently moving the same, of adjacently arranged delivery conveyors, unloading mechanism for removing the bottles from the main conveyor and depositing them in upright position on one of said delivery conveyors, and means operated by said main conveyor moving means and engageable with some of the bottles thus deposited to move them onto the adjacent delivery conveyor.

12. In a bottle washing machine, the combination with the main conveyor, and means for intermittently moving the same including a reciprocatory feed bar, of adjacently disposed delivery conveyors, unloading mechanism for removing the bottles from the main conveyor and depositing them in upright position on one of said delivery conveyors, and means having a lost motion operating connection with said feed bar and engageable with some of the bottles thus deposited to move them onto the adjacent delivery conveyor.

In testimony whereof, I affix my signature.

JOSEPH HAUK.